United States Patent [19]

Moore et al.

[11] Patent Number: 4,499,735
[45] Date of Patent: Feb. 19, 1985

[54] SEGMENTED ZONED FUEL INJECTION SYSTEM FOR USE WITH A COMBUSTOR

[75] Inventors: George W. Moore, Palm Beach Gardens; Robert G. Carroll, Jupiter, both of Fla.

[73] Assignee: The United States of America as represented by the Secretary of the Air Force, Washington, D.C.

[21] Appl. No.: 578,304

[22] Filed: Feb. 9, 1984

Related U.S. Application Data

[63] Continuation of Ser. No. 361,015, Mar. 23, 1982.

[51] Int. Cl.³ .............................................. F02C 7/22
[52] U.S. Cl. ......................................... 60/739; 60/746
[58] Field of Search ................. 60/734, 739, 740, 746, 60/747, 752, 754, 756

[56] References Cited

U.S. PATENT DOCUMENTS

| | | | |
|---|---|---|---|
| 2,780,915 | 2/1957 | Karen | 60/35.6 |
| 2,970,438 | 2/1961 | Howald | 60/746 |
| 3,020,717 | 2/1962 | Pearce | 60/746 |
| 3,485,045 | 12/1969 | Riecke | 60/746 |
| 3,515,040 | 6/1970 | Schutz | 60/39.74 |
| 3,698,186 | 10/1972 | Beane et al. | 60/746 |
| 3,974,646 | 8/1976 | Markowski et al. | 60/261 |
| 4,158,949 | 6/1979 | Reider | 60/754 |

Primary Examiner—Louis J. Casaregola
Assistant Examiner—Timothy S. Thorpe
Attorney, Agent, or Firm—Donald J. Singer; Jacob N. Erlich

[57] ABSTRACT

A segmented, zoned fuel injection system for use within the entrance area of a combustor. The fuel injection system has a plurality of spray bars formed as part of closely-spaced apart segments. The spray bars are zoned to permit additional control of profile and flow rate of fuel injected into the combustor. This design permits radial profile control within the combustor, maintains higher efficiency at low fuel flows and easy replacement and/or maintenance of the components thereof.

3 Claims, 3 Drawing Figures

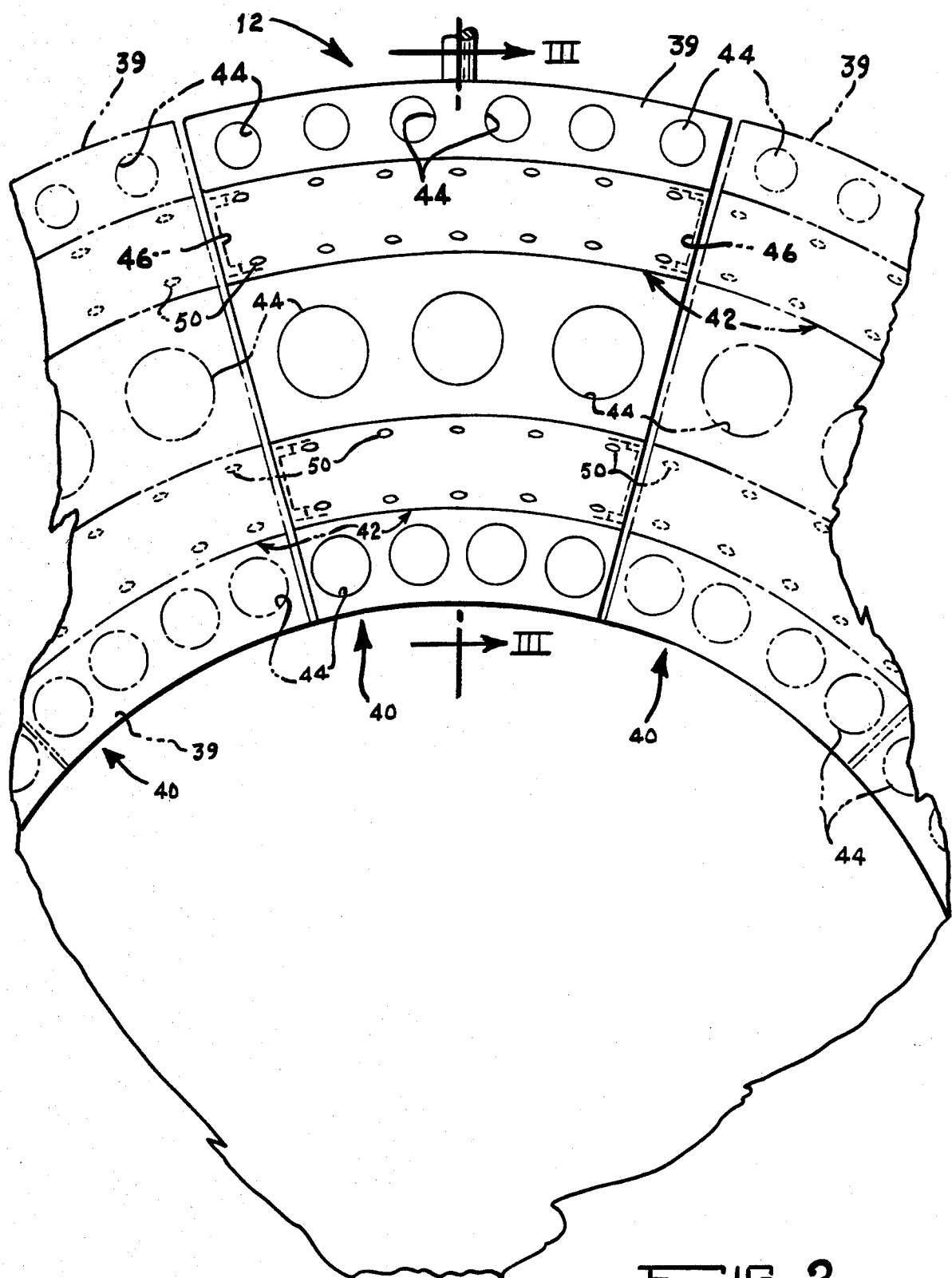

SEGMENTED ZONED FUEL INJECTION SYSTEM FOR USE WITH A COMBUSTOR

STATEMENT OF GOVERNMENT INTEREST

The invention described herein may be manufactured and used by or for the Government for governmental purposes without the payment of any royalty thereon.

This is a continuation of U.S. patent Ser. No. 361,015, filed Mar. 23, 1982.

BACKGROUND OF THE INVENTION

This invention relates generally to a main combustor in a gas turbine engine, and, more particularly, to a segmented, zoned fuel injection system for use within the combustor of the gas turbine engine.

Fuel is generally introduced into the combustion chamber of a combustor in a gas turbine engine by means of nozzles. Unfortunately, conventional nozzle fuel injectors generally have no accommodation for radial variation of fuel flow, since the conventional design is made up of a single, point source for the fuel nozzle. In addition, the conventional fuel nozzles are located two to three inches apart circumferentially.

Although such an arrangement can provide a desired flow variation circumferentially by utilizing a high or low flowing nozzle; such nozzles flow high or low during all flight conditions and flow requirements. For example, high local fuel flow at one flight point such as at ignition, would be a drawback at other flight points such as at maximum power where high local fuel flow creates a high pattern factor. More specifically, fuel spray discharge or injection systems of the past left much to be desired if a specific quantity of fuel were needed to be introduced at a specific location in the combustion chamber, if local circumferentially high temperatures at the turbine inlet were to be eliminated or if adjustment of fuel flow in the area of the igniter to aid ignition was desired.

It is therefore clearly evident from the above recited problems that it would be highly desirable to provide a fuel spray injection system which is capable of effective and efficient operation within a main combustor of a gas turbine engine.

SUMMARY OF THE INVENTION

The instant invention overcomes the problems encountered in the past and as set forth in detail hereinabove by providing a segmented, zoned fuel injection system which includes spray bars which can be readily incorporated within the main combustor of a gas turbine engine. Such a system as presented by this invention can provide a lowerpattern factor, improved ignition, improved control over radial profile, improved combustion efficiency at off design conditions and easy replacement for maintenance.

The fuel spray injection system of this invention is made up of a plurality of orificed spray bars which are installed in segments adjacent the cool inlet area of the combustion chamber of a combustor. In addition, the individual spray bars are zoned to permit additional control of profile and flow rate by individually feeding each zone. Each of the zones of each of the spray bars in a segment are supplied with fuel by means of individual conduits. These conduits can be arranged to supply fuel to each of the spray bars in all of the segments. Appropriate valves in the conduits regulate the amount of fuel supplied to and discharged from the spray bars.

The use of four zones per segment, for example, allows both radial and circumferential tailoring of the injected fuel. That is, a specific quantity of fuel can be introduced at a specific location in the combustion chamber to produce a desired radial temperature profile at the turbine inlet, to eliminate or reduce local circumferentially high temperatures at the turbine inlet due to compressor and diffuser airflow variations, and to locally adjust fuel flow in the area of the igniter to aid ignition.

Each zoned spray bar within a segment has a plurality of point sources in the form of spray orifices per zone, with the segment ends being situated extremely close together. The zoning feature allows the fuel to be introduced in stages (zones) typically controlled by the fuel flow rate or pressure. The great number of orifices located within each zoned spray bar provides substantially better (more uniform) fuel distribution than with the conventional fuel discharge nozzles of the past.

In addition, the use of zones allows high injection pressure drop at low fuel flow for improved atomization, and avoidance of fuel vaporization in the conduits. The combination of zoning and segmentation allows a reduction in the normal pump pressure requirement for a pressure atomized injection system since selected segments, for example every other one, can be utilized at low flow. The segmentation of the present invention also allows easy replacement of individual segments for maintenance or repair.

It is therefore an object of this invention to provide a fuel injection system which incorporates therein segmented, zoned spray bars.

It is a further object of this invention to provide a fuel injection system which is capable of supplying a specific quantity of fuel to a specific location in a combustion chamber.

It is another object of this invention to provide a fuel injection system which is capable of producing a desired radial temperature profile at the turbine inlet.

It is still a further object of this invention to provide a fuel injection system which substantially eliminates or reduces local circumferentially high temperatures at the turbine inlet.

It is still another object of this invention to provide a fuel injection system which is capable of locally adjusting fuel flow in the area of the igniter to aid ignition within the combustion chamber.

It is still another object of this invention to provide a fuel injection system which provides for a better or more uniform fuel distribution.

It is still a further object of this invention to provide a fuel injection system which allows high injection pressure drop at low fuel flows which aids fuel atomization and avoids fuel vaporization in the fuel conduits.

It is still a further object of this invention to provide a fuel injection system in which the individual components can be easily maintained and/or replaced.

It is still a further object of this invention to provide a fuel injection system which is economical to produce and which utilizes conventional, currently available components that lend themselves to standard mass producing manufacturing techniques.

For a better understanding of the present invention, together with other and further objects thereof, reference is made to the following description taken in con-

DETAILED DESCRIPTION OF THE DRAWING

FIG. 2 is a front view of the fuel injection system of this invention shown in segmented fashion.

DETAILED DESCRIPTION OF THE PREFERRED EMBODIMENT

Figure 1:
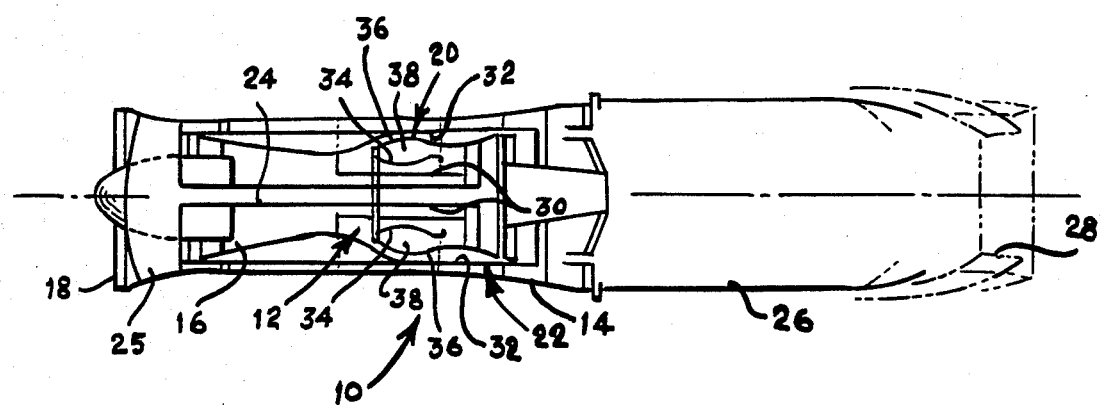
FIG. 1 is a schematic representation of a gas turbine engine which incorporates therein the fuel injection system of this invention.

Reference is now made to FIG. 1 of the drawing which schematically illustrates a typical gas turbine engine 10 in which the fuel injection system 12 of this invention is situated. Gas turbine engine 10 is made up of a duct-like housing 14 having an air compressor 16 journaled within the housing 14 adjacent its forward or upstream end. Air compressor 16 receives air through an annular air inlet 18 and delivers compressed air to the annular combustor 20 to be described in more detail hereinbelow.

Within combustor 20 air is burned with fuel and the resulting combustion gases are directed to the rotor blades of a turbine 22. A shaft 24 drivably connects the turbine 22 with air compressor fan 25 of compressor 16. From turbine 22 the combustion gases discharge rearwardly into an augmentor 26 and from there into the surrounding atmosphere through an exhaust nozzle 28 whereby the gas turbine engine 10 is provided with forward propulsive thrust.

Combustor 20 is made up of inner and outer annular walls 30 and 32 which encompass an inner annular liner 34 and an outer annular liner 36, respectively. Liners 34 and 36 form an annular space therebetween which constitutes the combustion chamber 38 of combustor 20. Fuel is supplied to the upstream end of combustion chamber 38 by the fuel injection system 12 of this invention so that the resulting fuel-air mixture within the combustion chamber 38 can be ignited by any suitable igniter (not shown) located therein.

Figure 3:
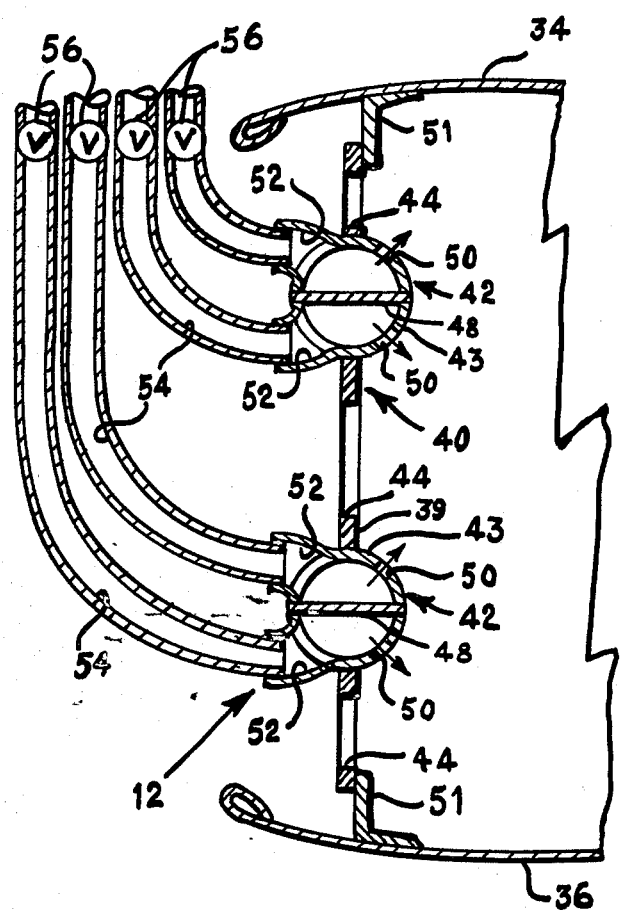
FIG. 3 is a cross sectional view of the fuel injection system of this invention taken along lines III—III of FIG. 2.

Reference is now made to FIGS. 2 and 3 of the drawing for a detailed description of the fuel injection system 12 of this invention. As shown in FIGS. 2 and 3 of the drawing, fuel injection system 12 includes a plurality of plates 39. Each plate 39 incorporates therein a pair of radially spaced apart tube-shaped spray bars 42, and a plurality of rows of varying sized openings 44. This combination of components within each plate 39 will hereinafter be referred to as a segment 40 of injection system 12. Spray bars 42 are utilized to supply fuel to combustion chamber 38 while openings 44 which may contain swirlers (not shown) therein are utilized to permit the introduction of the air into combustion chamber 38.

As stated above and as clearly shown in FIG. 2 of the drawing, fuel injection system 12 of this invention is made up of a plurality of segments 40. Since it is preferable for ease of manufacture of injection system 12 of this invention to make each segment 40 identical to another, for clarity and ease of understanding of this invention the following description will be with reference to only one such segment 40 and wherein identical elements of all segments will be referred to by the same numeral.

As depicted in FIG. 3, two spray bars 42 are set within each plate 39. Each spray bar 42 is in the form of a tubular-shaped element 43 having a circular cross section and having a cap 46 (shown in FIG. 2) at each end thereof. In addition, an internal plate 48 is positioned within each tubular-shaped element 43 and separates the spray bar 42 into two volumes. A plurality of spray orifices 50, typically 0.02 to 0.025 inches in diameter and approximately 0.150 to 0.250 inches apart, provide the appropriate fuel distribution into combustion chamber 38.

In addition, each zone of each spray bar 42 has its own input opening 52 so that it can be readily connected to a supply conduit 54. As shown in FIG. 3 of the drawing injector system 12 of this system preferably incorporates therein four separate supply conduits 54 which can be controlled by appropriate valves 56 operably connected thereto. It should be realized, however, that since each segment 40 making up injection system 12 of this invention are identical the four fuel supplying conduits 54 can be interconnected to all of the segments 40 so as to supply a regulated amount of fuel thereto. It should, however, be realized that each segment 40 may be independently supplied with fuel if such fuel distribution is desired.

Referring once again to FIG. 2 of the drawing, segments 40 are spaced very close together (approximately 0.250 inches apart) so as to produce a multitude of spray orifices 50 at the entrance of combustion chamber 38. Each of the segments 40 are secured between the inner and outer liners 34 and 36 of combustor 20 by means of any suitable mounting brackets 51 (as shown in FIG. 3 of the drawing) which also serve to close off the forward end of the combustor 20.

Although the number of openings 44 and number of spray bars 42 in each segment 40 may vary, the number shown in the Figures of the drawing are capable of providing a preferred fuel distribution to combustion chamber 38. By providing a plurality of zones within the fuel injection system 12 of this invention, fuel can be introduced into combustion chamber 38 in stages typically controlled by fuel flow rate or pressure. Therefore, at low fuel flow, one zone in each segment 40 is allowed to flow, with the segment adjacent to the igniter having more flow than the others, thus aiding ignition. As engine fuel flow is increased, the zones are brought in line in whatever sequence desired, with the sequence controlled by valves 56. At maximum power, the locally rich area provided for ignition is a very small fraction of the flow to the segment and an acceptable fuel distribution results. To adjust the fuel distribution radially, one has only to adjust the fixed orifice injection points 50 at each segment. That is, if a higher temperature profile is desired at the combustor outer diameter then larger and/or more injection orifices are provided at the combustor outside zones. The provision of many fixed orifices 50 provides more uniform fuel distribution than heretofore attainable with past fuel injection nozzles.

In addition, the use of zones allow high injection pressure drop at low fuel flows for improved atomization, and avoidance of fuel vaporization in the conduits 54. The combination of zoning and segmentation allows for a reduction in the maximum pressure requirement since selected segments can be utilized at low flow. In addition, segmentation also allows for easy replacement of individual segments 40 within the fuel injection system 12 of this invention and for easy maintenance and repair.

The use of four zones, for example, per segment 40 allows both radial and circumferential tailoring of the injected fuel into the combustion chamber 38. That is, a specific quantity of fuel can be introduced at a specific location to produce a desired radial temperature profile at the turbine inlet, to eliminate or reduce local circumferentially high temperatures at the turbine inlet due to compressor and difusser air flow variations, and to locally adjust fuel flow in the area of the igniter in order to aid ignition.

Although this invention has been described with reference to a particular embodiment, it will be understood that this invention is also capable of further and other embodiments within the spirit and scope of the appended claims.

We claim:

1. A removable fuel injection system for use in conjuction with a combustor, said fuel injection system comprising:
    a plurality of circumferentially spaced-apart segments, each of said segments being in the form of a wedge-shaped plate;
    means for mounting each of said circumferentially spaced-apart plates adjacent one another and adjacent the entrance of said combustor so as to form an annular-shaped body;
    each of said plates including means for injecting fuel into said combustor and means for permitting gas to flow into said combustor;
    said fuel injecting means being in the form of a plurality of radially spaced-apart tubular-shaped, circumferential spray bars, all of said spray bars lying in substantially the same radial plane;
    each of said spray bars having a plurality of sets of fuel injecting orifices therein, said orifices of each of said sets of orifices being disposed in a circumferential, spaced-apart relationship with respect to one another, and a plate located within the interior of each of said tubular-shaped spray bars for dividing each of said spray bars into a pair of separate fuel injecting zones;
    said gas flow permitting means being in the form of a plurality of sets of openings of preselected size, said openings of each of said sets of openings being disposed in a circumferential, spaced-apart relationship with respect to one another, and each of said sets of said openings and spray bars being alternately spaced-apart in the radial direction; and
    means operably connected to each of fuel injecting zones for providing a regulated amount of fuel to each of said zones, whereby the amount and location of said fuel being injected into said combustor can be controlled.

2. A fuel injection system as defined in claim 1 wherein said means for providing said regulated amount of fuel to each of said zones of said spray bars in one of said plates comprises a separate conduit and a valve.

3. A combustor for a gas turbine engine comprising:
    an inner liner;
    an outer liner, said inner liner and outer liners being disposed with respect to each other so as to define therebetween an annular-shaped combustion chamber, said combustion chamber having an inlet at one end thereof; and
    a removable fuel injection system located adjacent said inlet end of said combustion chamber, said fuel injection system being formed of a plurality of circumferentially spaced-apart segments, each of said segments being in the form of a wedge-shaped plate; means for mounting each of said circumferentially spaced-apart plates adjacent one another and adjacent the entrance of said combustor so as to form an annular-shaped body; each of said plates including means for injecting fuel into said combustor and means for permitting gas to flow into said combustor; said fuel injecting means being in the form of a plurality of radially spaced-apart, tubular-shaped, circumferential spray bars, all of said spray bars lying in substantially the same radial plane; each of said spray bars having a plurality of sets of fuel injecting orifices therein, said orifices of each of said sets of orifices being disposed in a circumferential, spaced-apart relationship with respect to one another, and a plate located within the interior of each of said tubular-shaped spray bars for dividing each of said spray bars into a pair of separate fuel injecting zones; said gas flow permitting means being in the form of a plurality of sets of openings of preselected size, said openings of each of said sets of openings being disposed in a circumferential, spaced-apart relationship with respect to one another, and each of said sets of said openings and spray bars being alternately spaced-apart in the radial direction; and means operably connected to each of said fuel injecting zones for providing a regulated amount of fuel to each of said zones, whereby the amount and location of said fuel being injected into said combustor can be controlled.

* * * * *